(12) United States Patent
Nielsen, Jr. et al.

(10) Patent No.: US 6,716,292 B2
(45) Date of Patent: *Apr. 6, 2004

(54) UNWROUGHT CONTINUOUS CAST COPPER-NICKEL-TIN SPINODAL ALLOY

(75) Inventors: William D. Nielsen, Jr., Grafton, OH (US); William D. Nielsen, Sr., Grafton, OH (US)

(73) Assignee: Castech, Inc., Pinehurst, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 30 days.

(21) Appl. No.: 08/552,582

(22) Filed: Nov. 3, 1995

(65) Prior Publication Data

US 2002/0007879 A1 Jan. 24, 2002

Related U.S. Application Data

(63) Continuation of application No. 08/475,361, filed on Jun. 7, 1995, now abandoned.

(51) Int. Cl.$^7$ ................................................ C22C 09/02
(52) U.S. Cl. .................. 148/433; 148/553; 148/686; 420/473
(58) Field of Search ...................... 148/553, 686, 148/433, 435; 420/473

(56) References Cited

U.S. PATENT DOCUMENTS

| | | | |
|---|---|---|---|
| 3,954,519 A | 5/1976 | Inoue | 148/101 |
| 3,971,656 A | 7/1976 | Rudy | 419/16 |
| 4,008,105 A | 2/1977 | Yuda et al. | 148/101 |
| 4,073,667 A | 2/1978 | Caron et al. | 148/682 |
| 4,171,978 A | 10/1979 | Inoue | 420/36 |
| 4,251,293 A | 2/1981 | Jin | 148/101 |
| 4,260,432 A | 4/1981 | Plewes | 148/685 |
| 4,263,044 A | 4/1981 | Inoue | 420/37 |
| 4,273,595 A | 6/1981 | Inoue et al. | 148/103 |

(List continued on next page.)

FOREIGN PATENT DOCUMENTS

| | | | |
|---|---|---|---|
| CA | 2069023 | * | 12/1992 |
| DE | 4215576 | * | 12/1992 |
| JP | 62093357 | * | 4/1987 |

OTHER PUBLICATIONS

Sahoo, M; Wirth, M., "Grain refinement of a cast copper–nickel–tin spinodal alloy," Trans. Am. Foundrymen's Soc (1990), 98,25–33. (abstract only).*

Hadi, Abboud, Ja'Afar et al., "Modification of the spinodal hardening in a Copper–9 nickel–6 tin alloy by 0.1% silicon or aluminum addition," J. Mater. Sci. Lett. (1983), 2(5), 233–5 (abstract only).*

Schwartz, et al. "Spinodal decomposition in a copper 9 wt.% nickel 6 wt.% tin alloy," Acta Met. (1974), 22(5), 601–9 (abstract only).*

Sogabe et al., "Precipitation in a copper–nickel–tin (Cu–9N.–6 Sn) alloy," Niihama Kogyo Koto Semmon Gakko Kiyo, Rikogaku Hen (1981), 17, 63–8 (abstract only).*

*Primary Examiner*—Sikyin Ip
(74) *Attorney, Agent, or Firm*—Fay, Sharpe, Fagan, Minnich & McKee, LLP

(57) ABSTRACT

An unwrought continuous cast Cu—Ni—Sn spinodal alloy and a method for producing the same is disclosed. The Cu—Ni—Sn spinodal alloy is characterized by an absence of discontinuous γ' phase precipitate at the grain boundaries, ductile fracture behavior during tensile testing, high strength, excellent wear and corrosion resistance, superior bearing properties, and contains from about 8–16 wt. % nickel, from about 5–8 wt. % tin, and a remainder copper.

17 Claims, 10 Drawing Sheets

U.S. PATENT DOCUMENTS

| | | | |
|---|---|---|---|
| 4,315,538 A | 2/1982 | Nielsen | 164/488 |
| 4,324,597 A | 4/1982 | Kamino et al. | 148/103 |
| 4,366,007 A | 12/1982 | Inoue | 148/102 |
| 4,388,270 A | 6/1983 | Stavish et al. | 420/473 |
| 4,399,482 A | 8/1983 | Inoue | 361/145 |
| 4,406,712 A | 9/1983 | Louzon | 148/685 |
| 4,417,922 A | 11/1983 | Hall et al. | 75/236 |
| 4,451,292 A | 5/1984 | Hall et al. | 75/238 |
| 4,488,962 A | 12/1984 | Inoue | 210/138 |
| 4,525,325 A | 6/1985 | Livak | 420/473 |
| 4,641,976 A | 2/1987 | Kar | 384/95 |
| 4,681,629 A | 7/1987 | Reinshagen | 75/246 |
| 4,683,013 A | 7/1987 | Iijima et al. | 148/102 |
| 4,695,333 A | 9/1987 | Inoue et al. | 148/306 |
| 4,707,633 A | 11/1987 | Hoshi | 313/402 |
| 4,715,904 A | 12/1987 | Iijima et al. | 148/102 |
| 4,732,625 A | 3/1988 | Livak | 148/433 |
| 4,956,026 A | 9/1990 | Bell | 148/518 |
| 5,019,185 A | 5/1991 | Nakajima et al. | 148/686 |
| 5,049,619 A | 9/1991 | Kyu | 525/148 |
| 5,089,057 A | 2/1992 | Plewes | 148/685 |
| 5,196,074 A | 3/1993 | Welter et al. | 148/514 |
| 5,198,044 A | 3/1993 | Colijn et al. | 148/514 |
| 5,279,353 A | 1/1994 | Nielsen, Sr. et al. | 164/489 |
| 5,381,125 A | 1/1995 | Chen et al. | 338/32 R |

* cited by examiner

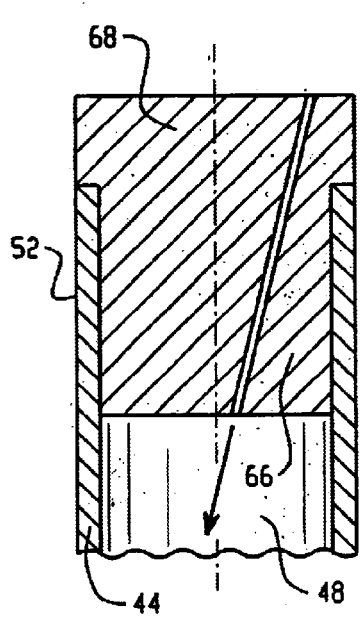 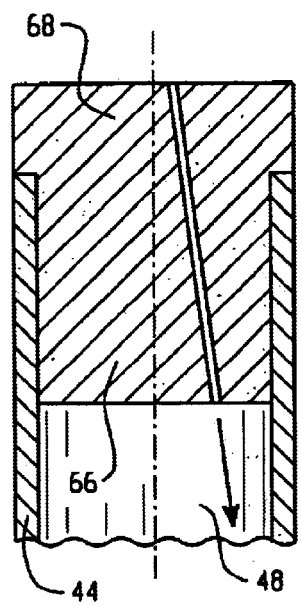 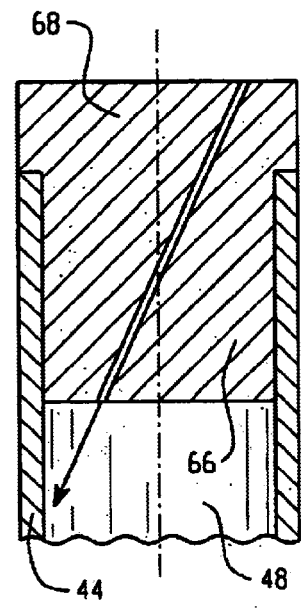
Fig. 5A   Fig. 5B   Fig. 5C
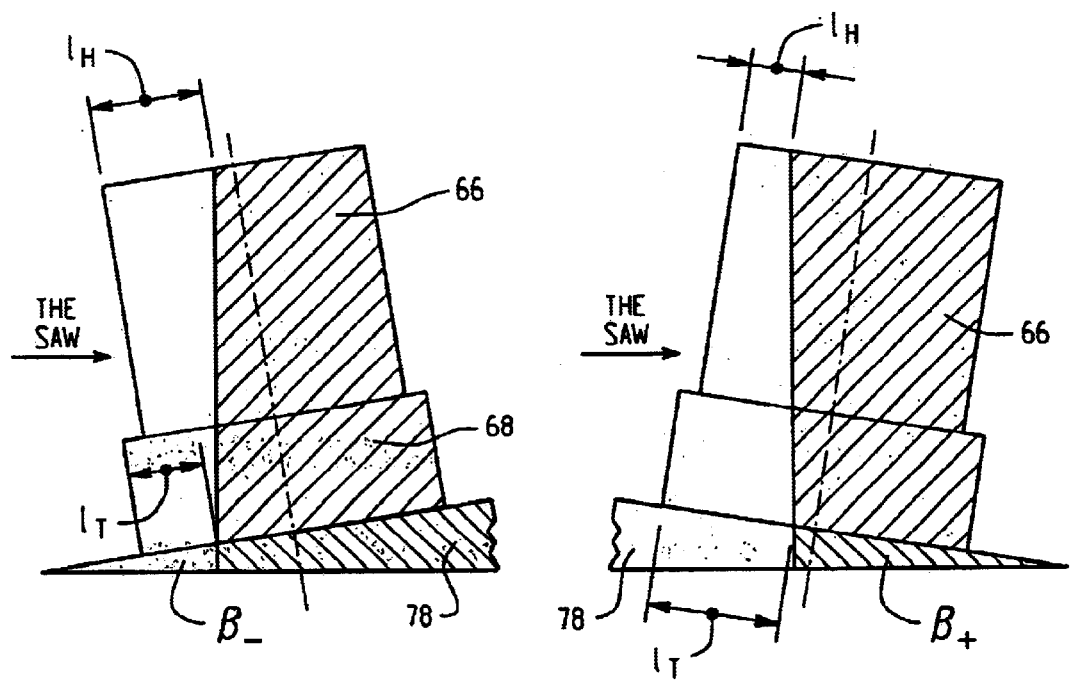
Fig. 6A   Fig. 6B

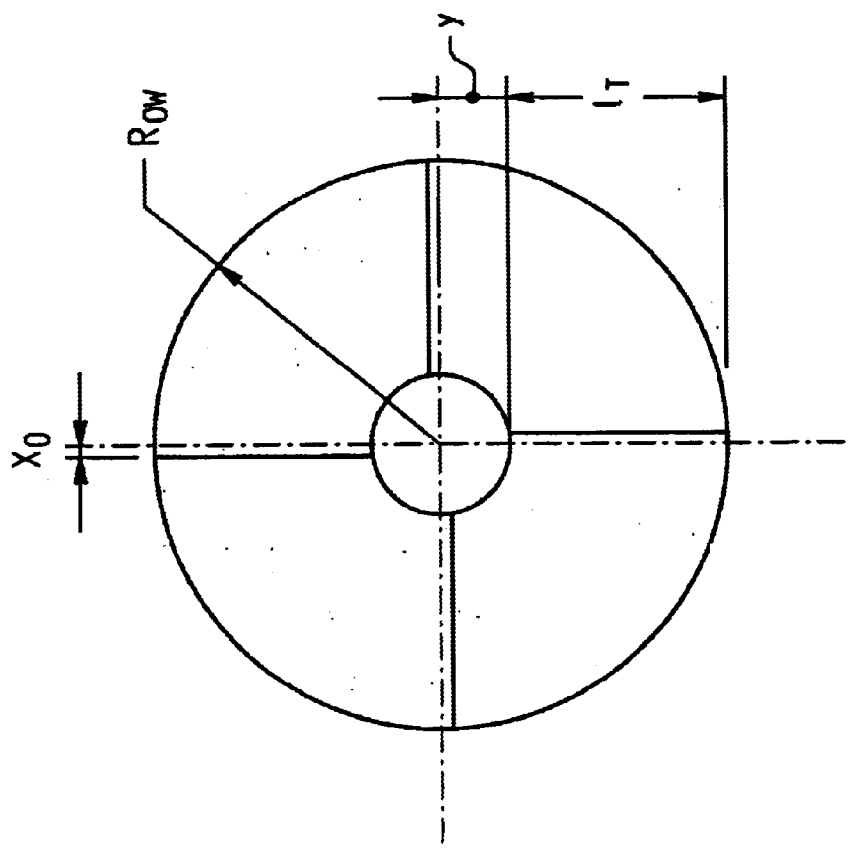
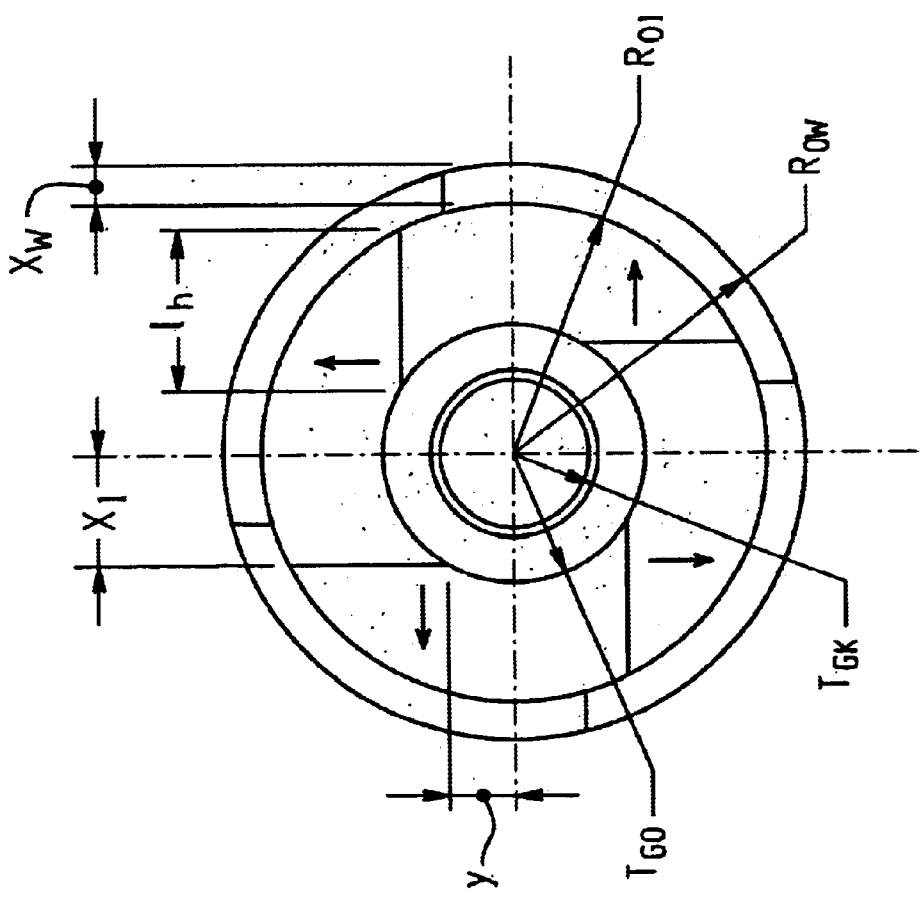

UNWROUGHT CONTINUOUS CAST COPPER-NICKEL-TIN SPINODAL ALLOY

This application is a continuation-in-part of Ser. No. 08/475,361 filed on Jun. 7, 1995 now abandoned.

BACKGROUND OF THE INVENTION

The present invention pertains to continuous cast Cu—Ni—Sn spinodal alloys, and more particularly to a method for producing a continuous cast Cu—Ni—Sn spinodal alloy wherein it is unnecessary to subject the billet or rod to wrought processing prior to the spinodal heat treatment. The Cu—Ni—Sn spinodal alloy is characterized by a substantial absence of discontinuous γ' phase precipitate at its grain boundaries. The symbol γ' corresponds to the metastable coherent discontinuous precipitate referred to in the prior art having elevated percentages of Ni and Sn. The superscript distinguishes γ' from γ which is also an elevated percentage Ni and Sn precipitate which is both stable and incoherent and differs from γ' in that it does not cause embrittlement while adding strength.

It has been known to be beneficial to all casting and metal working schemes to have the grain boundaries be as thin and grain size as small as possible. For this reason, it was considered desirable to develop an arrangement which would readily facilitate obtaining such fine grain structures in continuous cast copper alloy rods and tubes. Such rods and tubes would then satisfactorily accommodate subsequent cold drawing or working or would exhibit better properties than other unwrought materials. Thus, U.S. Pat. No. 4,315,538 disclosed a method and apparatus to effect a fine grain size in continuous cast metals. This method involved the use of a continuous casting die totally submerged in a reservoir of liquid alloy material and the use of feed openings in the die arranged so that the liquid metal entering the die would impart a generally cyclonic motion at the interface zone between the liquid and solid alloy material. This cyclonic motion caused shearing of primary dendrites in the alloy material from adjacent the internal side wall of the die and distributed those dendrites across the interface zone to provide nuclei for equiaxed crystals, thereby preventing the formation of thermal gradients in the alloy material of a sufficient magnitude to produce gross directional solidification at the interface zone.

The subject of U.S. Pat. No. 5,279,353 was a die construction for use with the same type of continuous casting apparatus, but with an improved ability to produce a fine grain structure in tubes with wall thicknesses greater than 0.5 inch, as well as in other cast shapes, such as round shaped rods, billets, or non-round rods and billets. We estimate the grain size of the resultant cast shape to be greater than 20 μm, possibly as large as 40 μm, but still substantially smaller than shapes cast by other means.

We have subsequently discovered that an additional benefit for producing copper metallic alloys according to the continuous cast method set out in our U.S. Pat. No. 5,279,353, said metallic alloys composed of small, equiaxed crystals, relates to the production of copper alloys requiring spinodal decomposition type phase transformation to achieve desired physical properties.

Spinodal decomposition type phase transformation in a multicomponent alloy system is described in U.S. Pat. No. 3,806,336 issued Apr. 23, 1974; U.S. Pat. No. 3,954,519 issued May 4, 1976; and U.S. Pat. No. 4,171,978 issued Oct. 23, 1979. As described in those patents, a certain binary and other metallic has, in its composition diagram, a "limit of metastability" or "spinodal" which is thermodynamically defined as the locus of disappearance of the second derivative of the chemical free energy with respect to composition of the system. When a high-temperature composition, which is of homogeneous single-phase structure, of the alloy is brought within the spinodal in a low temperature range, it is transformed into a separated two-phase structure, the phase separation being called spinodal decomposition. The decomposed alloy has a periodic microstructure generally in the order of hundred of angstroms and which consists of composition modulated two isomorphous phases in which one phase is in the form of a fine precipitate uniformly distributed in another phase which forms the matrix.

It is known that an alloy requiring a spinodal transformation must have a homogeneous composition throughout the entire alloy. Within the homogeneous volume, it is possible, by thermal treatment, to cause a shift in atomic concentration of certain of the solute metals comprising the alloy. Such a change, spinodal decomposition, imparts new physical properties to the alloy.

One skilled in the art is aware that microsegregation of solute elements results in areas exhibiting various responses to spinodal heat treatments. Typically, continuous cast billets or other castings always exhibit gross inverse segregation as well as "coring" or microsegregation within dendritic cells. To render such billets or castings fit for spinodal treatment, the metal parts have in the past been subjected to wrought processing to reduce microsegregation by "kneading" the material to mechanically reduce the secondary inter-dendritic distances. The wrought processing typically involves rolling, drawing, or pilgering to reduce the cross-sectional area dimensions by 40–90%. When very large degrees of cold working are employed to effect a 40–90% reduction in the cross-sectional area, however, it is very costly or even impossible to produce alloy parts large enough to function in many applications.

Further wrought processing cannot overcome the gross inverse segregation exhibited by alloys that have wide freezing ranges. Because these alloys have wide freezing ranges, concentration fluctuations of solute elements over a given distance within the body of the alloy are too large to effectively eliminate by solution heat treatment; consequently, these alloys will not spinodally decompose; furthermore, they are susceptible to forming other embrittling metastable phases via discontinuous precipitation.

By use of our continuous cast process to form billets, rods, or tubes, in combination with our method for manufacturing the Cu—Ni—Sn spinodal alloy, it is now possible to avoid all of the aforementioned difficulties of the processes disclosed in the past, particularly the need to subject the metal parts to wrought processing prior to spinodal decomposition. A rod or tube manufactured according to our continuous cast process advantageously has the following characteristics: (1) uniform solute distribution from surface to center and (2) a greatly reduced secondary inter-dendritic arm spacing, which cannot be achieved by conventional means. The secondary inter-dendritic arm spacing of the crystals manufactured in accordance with our process is only one-tenth or less than that for other materials. Consequently, fluctuations in the solute element concentration in the homogenized alloy are minimized, thereby permitting the spinodal transformation of a greater volume of the alloy while simultaneously avoiding precipitation of other undesirable metastable phases which have an adverse effect on ductility and toughness. Further, by use of our method disclosed for manufacturing the Cu—Ni—Sn spinodal alloy, the resultant spinodal alloy is characterized by a substantial absence of discontinuous γ' phase precipitate at its grain boundaries. In this regard, it is now possible to produce rods having a cross-section greater than ⅜ inches, which can subsequently be thermally processed in an unwrought condition to develop high strength and ductility and are therefore suitable in the production of various components which include, among other things, journal bearings, wear plates, mold plates, and gravure printing rolls.

INCORPORATION BY REFERENCE

U.S. Pat. No. 5,279,353 is incorporated by reference herein as background information with respect to the present invention.

BRIEF SUMMARY OF THE INVENTION

The present invention provides a Cu—Ni—Sn spinodal alloy which is continuous cast in such a manner as to effect small, equiaxed crystals, and subjected to various heat and aging treatments to effect spinodal decomposition type phase transformation without the need for wrought processing.

According to a first aspect of the invention, an unwrought continuous cast Cu—Ni—Sn spinodal alloy is disclosed which comprises from about 8–16 wt. % nickel, 5–8 wt. % tin, and a remainder copper. The alloy is further characterized by a substantial absence of discontinuous γ' phase precipitate at its grain boundaries and ductile fracture behavior during tensile testing.

According to a second aspect of the invention, a method for manufacturing an unwrought continuous cast Cu—Ni—Sn spinodal alloy is disclosed. The Cu—Ni—Sn alloy is continuous cast in such a manner as to effect small, equiaxed crystals. The alloy is subjected to a solution heat treatment at a predetermined optimal temperature for a predetermined length of time to transform the matrix of the alloy to a single phase and immediately quenched with cold water. The resultant alloy is then subjected to a spinodal decomposition (aging) heat treatment at a predetermined optimal temperature and for a predetermined length of time and again immediately quenched with cold water.

According to a third aspect of the invention, a method for determining optimal temperatures and times for a heat treatment used in the manufacture of an unwrought continuous cast Cu—Ni—Sn spinodal alloy is disclosed. An unwrought continuous cast Cu—Ni—Sn alloy having small, equiaxed crystals is provided. A first sample of the alloy is subjected to a first solution heat treatment immediately followed by quenching, preferably with cold water. The first alloy sample is next subjected to a first spinodal decomposition heat treatment immediately followed by a step of quenching with an aqueous medium such as cold water. A second sample of the alloy is subjected to a second solution heat treatment immediately followed by a step of quenching, preferably with cold water. Thereafter, the second alloy sample is subjected to a second spinodal decomposition heat treatment immediately followed by a step of quenching with an aqueous medium such as cold water. The two (2) spinodal alloy samples are metallographically examined to determine the optimal temperatures and corresponding times for an optimal heat treatment which comprises both a solution heat treatment and a spinodal decomposition heat treatment. The optimal heat treatment yields a Cu—Ni—Sn spinodal alloy having optimal hardness and ductility.

One advantage of the present invention is that a Cu—Ni—Sn spinodal alloy having both strength and ductility can be produced without the need for wrought processing to reduce microsegregation within dendritic cells.

Another advantage of the present invention is that a continuous cast billet or rod is manufactured having uniform solute distribution from surface to center which can be subjected to spinodal decomposition without the need for wrought processing.

Still another advantage of the present invention is that a continuous cast billet or rod is manufactured having secondary inter-dendritic arm spacing of one-tenth or less than that of typical continuous cast materials which can be subjected to spinodal decomposition without the need for wrought processing.

Still another advantage of the present invention is that an unwrought Cu—Ni—Sn spinodal alloy is simply and economically manufactured.

Still another advantage of the present invention is that an unwrought continuous cast Cu—Ni—Sn spinodal alloy having optimal mechanical properties can be produced.

Still another advantage of the present invention is that an unwrought Cu—Ni—Sn spinodal alloy being essentially free of a discontinuous γ' phase at the grain boundaries can be produced.

Still another advantage of the present invention is that heavy objects having a cross-section greater than ⅜ inches for a rod and up to 16 inches for a billet can be thermally processed in an unwrought condition to yield high strength and ductility.

Still another advantage of the present invention is that an unwrought Cu—Ni—Sn spinodal alloy can be produced which is able to reach and exceed necking strain prior to fracture during tensile testing.

Still another advantage of the present invention is that an unwrought Cu—Ni—Sn spinodal alloy can be produced which exhibits ductile fracture behavior during tensile testing.

Still another advantage of the present invention is that the higher temperatures used for heat treating the unwrought Cu—Ni—Sn allow reduction in the time the billet must remain in the furnace thereby resulting in improved financial savings as well as improved productivity.

Still a further advantage of the present invention is that a wide array of products can be simply and economically manufactured using the Cu—Ni—Sn spinodal alloy prepared by the disclosed processing. Such products include, among other things, bearings, gears, and other wear parts such as aircraft landing gear bearings, stamping press wear plates, molds and other components for die casting or plastic injection, heavy equipment bearings, and fluid power transmission system components.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, preferred and alternative embodiments of which will be described in detail in this specification and illustrated in the accompanying drawings which form a part hereof, and wherein:

FIG. 5A shows a first view illustrating the disposal of slots in the die cap taken along lines 5—5 of FIG. 3;

FIG. 5B shows a second view illustrating the disposal of slots in the die cap taken along lines 5—5 of FIG. 3;

FIG. 5C shows a third view illustrating the disposal of slots in the die cap taken along lines 5—5 of FIG. 3.

FIG. 6A shows a first way used to make slots in the die cap, the view being taken along lines 6—6 of FIG. 4;

FIG. 6B shows a second way used to make slots in the die cap, the view being taken along lines 6—6 of FIG. 4;

FIG. 7C shows a third set of angles and dimensions used in calculating the design of the die cap, to provide the optimum conditions for formation of fine grain structure;

FIG. 7D shows a fourth set of angles and dimensions used in calculating the design of the die cap, to provide the optimum conditions for formation of fine grain structure;

DETAILED DESCRIPTION OF THE PREFERRED AND ALTERNATE EMBODIMENTS

Figure 1:
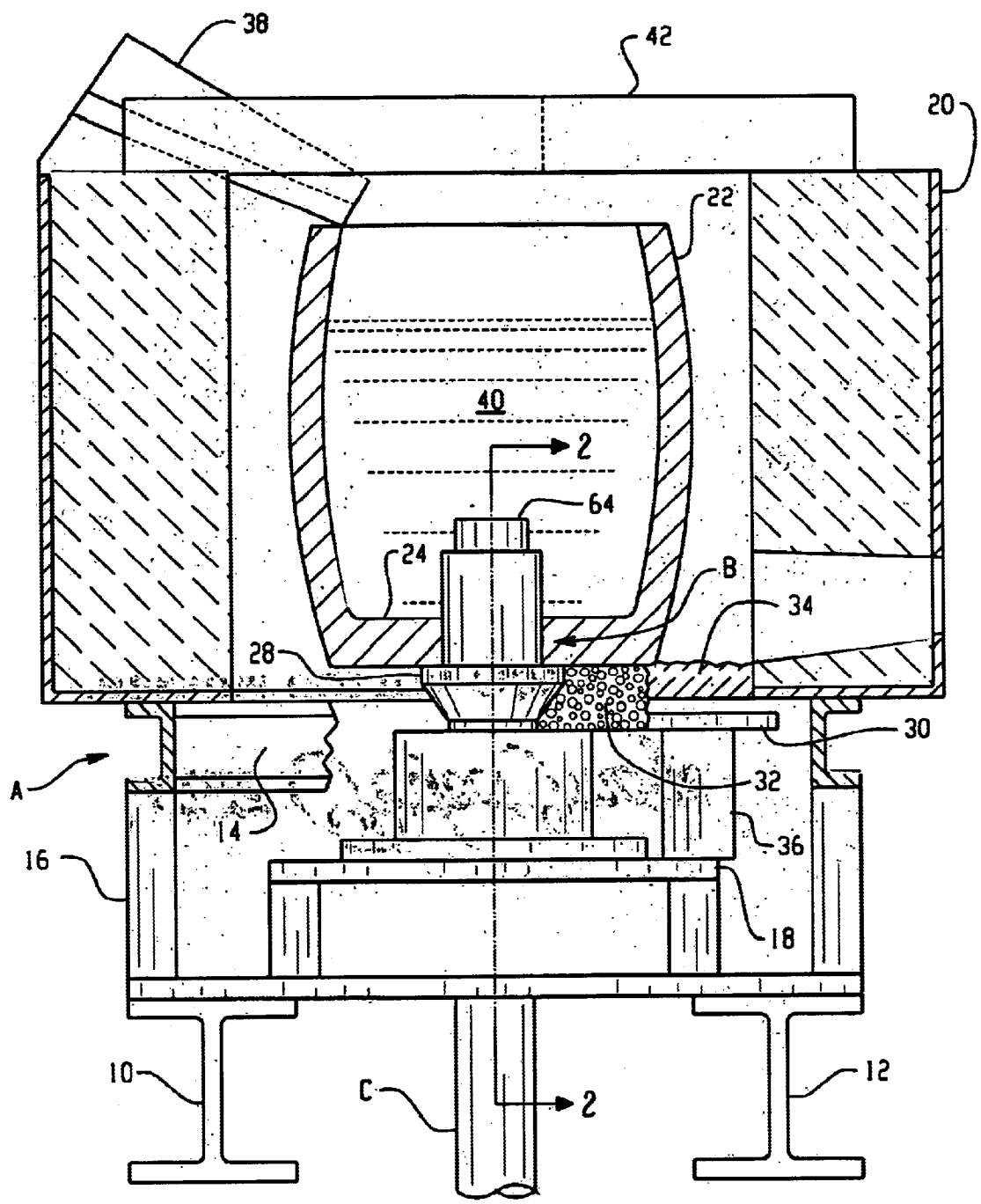
FIG. 1 is a somewhat schematic view in partial cross-section of a typical facility used in continuous casting of metallic rod and tube members for ease of appreciating the general environment to which the invention is particularly directed.

Referring now to the drawings wherein the showings are for purposes of illustrating the preferred and an alternative embodiment of the invention only and not for purposes of limiting the same, FIG. 1 shows a continuous vertical casting facility A including a die and cooler assembly cap B for the continuous casting of a solid rod member or strand C. While many different metals, including brass, aluminum, bronze and the like, are cast by using such apparatus, we focus herein on the continuous casting of a Cu—Ni—Sn alloy material into solid rods or tubes.

The Cu—Ni—Sn alloy contains from 8–16 wt. % nickel, from 5–8 wt. % tin, and a remainder copper, excluding impurities and minor additions. Minor additions include boron, zirconium, iron, and niobium, which further enhance the formation of equiaxed crystals and also diminish the dissimilarity of the diffusion rates of Ni and Sn in the matrix during solution heat treatment. Another minor addition includes magnesium which deoxidizes the alloy when the alloy is in the molten state. We have also discovered that the addition of manganese significantly improves the ultimate properties developed whether or not sulfur is present in the alloy as an impurity. Other elements may also be present. Not more than about 0.3% by weight of each of the foregoing elements is present in the Cu—Ni—Sn alloy.

Continuous casting facility A may comprise any number of types of styles of such facilities which could advantageously incorporate the concepts of the subject invention thereinto. One such facility is generally schematically shown in FIG. 1 and includes a pair of spaced apart beam-like bases 10, 12 supporting upper frame members generally designated 14, 16. A platform type arrangement generally designated 18 is supported by members 10, 12 which itself, supports a portion of die and cooler assembly B. Platform type arrangement 18 includes suitable openings therethrough in line with the die and cooler assembly to permit passage of tube or rod C therethrough. An open ended cylindrical holding furnace sleeve 20 is supported by frame members 14, 16 and receives a generally cup-shaped crucible 22 therein. Crucible 22 acts as a liquid alloy reservoir and includes a bottom wall 24 having a portion of die and cooler assembly B extending therethrough. A radially outward extending flange 28 on the die and cooler assembly engages the underside of bottom wall 24 to provide a convenient locating relationship between these components.

A bottom plate generally designated 30 is supported by a portion of the die and cooler assembly closely adjacent the bottom of holding furnace sleeve 20. This bottom plate in turn provides a base for a cementitious material generally designated 32 disposed about the lowermost end of the crucible and around a portion of the die and cooler assembly. Plate 30 further provides a base for fire clay material 34 interposed between cementitious material 32 and inner wall of sleeve 20. Fire clay brick generally designated 36 is conveniently interposed between platform 18 and the lower surface of bottom plate 30. A pouring spout generally designated 38 facilitates pouring of molten copper alloy metal 40 from outside the holding furnace to crucible 22 and the holding furnace lid 42 is conveniently provided to cover the top of sleeve 20 to thereby substantially enclose the crucible.

During a continuous casting operation, tube or rod member C emerges in a generally vertical disposition from the lower end of die and cooler assembly B. In the type of casting process to which the subject invention is particularly directed, appropriate pinch rolls (not shown) are disposed beneath the die and cooler assembly for withdrawing the tube or rod from the die as it is being cast. These pinch rolls are conventional and include means for coordinating the operation of the remainder of the facility components for achieving the desired physical characteristics for rod or tube C in a manner to be described hereinafter.

Casting facility A as shown in FIG. 1 merely comprises a general or schematic showing of the various components as well as their relative relationships to each other for permitting an appreciation of the particular environment hereinvolved. The specific construction, components and so on may vary between the individual continuous casting facilities and such variances are not deemed to in any way effect the overall scope or intent of the present invention. Moreover, and in view of the fact that the facility itself does not form a part of the invention and that operation thereof is generally known in the art, a further detailed description thereof is deemed unnecessary to permit those skilled in the art to have a full and complete understanding of the invention.

Figure 2:
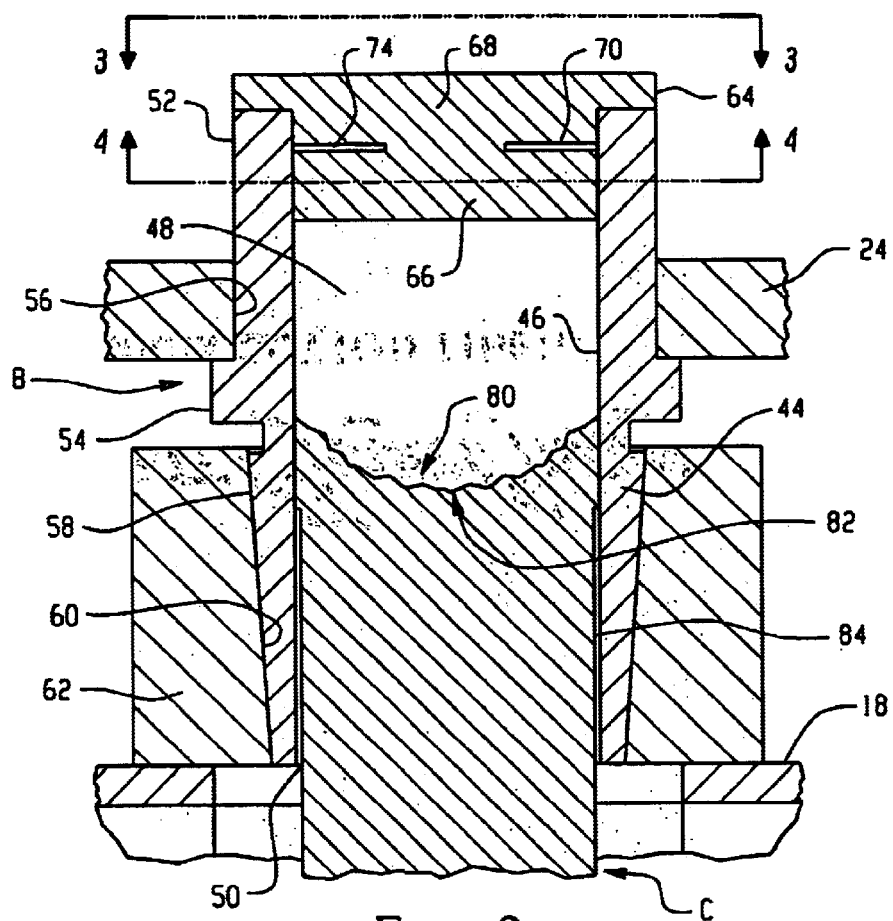
FIG. 2 is a partial cross-sectional view taken along lines 2—2 of FIG. 1 for showing the die and die feed slots utilized in practicing the subject invention.

In that regard, FIG. 2 shows a partial cross-sectional view of die and cooler assembly B and a portion of a continuous rod or tube C during casting thereof. Also shown is the area of interface between the die and cooler assembly with crucible or reservoir 22. More particularly, the casting die is comprised of a somewhat tubular shell-like arrangement generally designated 44. This shell-like arrangement may be constructed from any number of different materials commonly associated with such dies. In the preferred arrangement, the internal surface 46 defines a cylindrical die cavity between the die entrance end or area generally designated 48 and the opposite exit end or area generally designated 50. It will be appreciated that the internal surface could take other cross-sectional configurations and is dependent upon the outer wall configuration for the rod or tube itself.

Outer wall 52 of shell 44 has a generally cylindrical configuration over the upper end thereof and a radially outward extending flange 54. As is seen in FIG. 2, the die upper end is closely received through opening 56 in bottom wall 24 of the crucible with flange 54 then closely engaging the outside of the crucible bottom wall. The die outer wall portion 58 has a tapered configuration tapering inwardly from adjacent flange 54 toward exit end 50 and is adapted to be closely received against tapered inner wall 60 of a cooler 62.

Cooler 62 may comprise any type of conventional cooling manifold for purposes of cooling the die and strand during a continuous casting operation. Coolant is typically circulated through the manifold with the coolant inlet being spaced toward die exit end 50 and the coolant outlet being spaced adjacent the upper end.

We have discovered that a preferred material can be obtained at more economical production rates if the height of the cooler 62 is within the following range:

$$1 \leq h \leq 30$$

where h is the height of the cooler in inches and 1 and 30 are also in units of inches. In addition, the range of dimension of cross-section of the casting is preferably within the following range:

$$0 \leq \emptyset \leq 30$$

where Ø is the range of dimension of cross-section of casting in inches and 0 and 30 are also in units of inches.

The most preferred method employs a cooler 62 wherein h=1.5 (Ø) but for economic reasons and for broad applications of standardized h to varying Ø in commercial use, we have discovered that the most preferred cooler height will fall within the range of 3 to 9 inches for product having cross-sectional dimensions≧0.375 inches and ≦29 inches.

Figure 3:
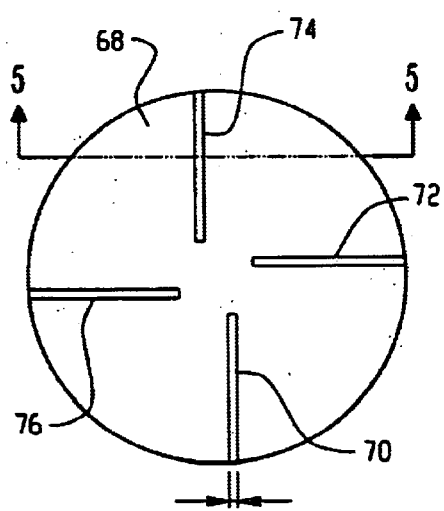
FIG. 3 shows the view on the die from the top.

With continued reference to FIG. 2, as well as reference to FIG. 3, a cap or plug member designated 64 acts as a cover for the open upper end of shell 44 adjacent area 48 for preventing ingress of liquid alloy into the shell at that area. Cap 64 includes a first cylindrical portion 66 closely received within the shell top end area and a second slightly larger portion 68 which defines a radial flange disposed in engagement with the shell upper end face.

Figure 4:
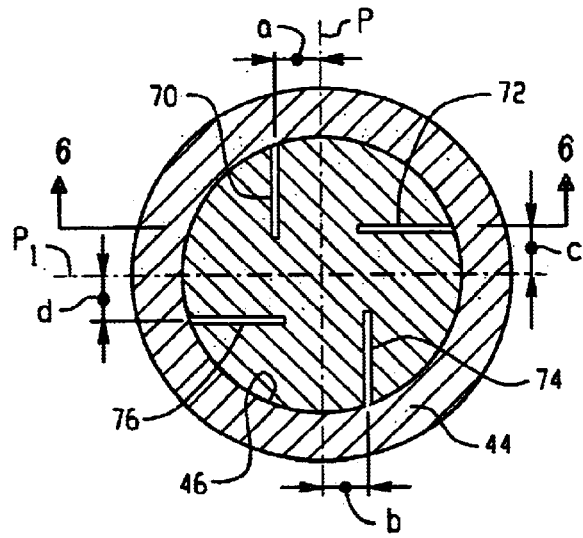
FIG. 4 is a partial cross-sectional view taken along lines 4—4 of FIG. 2 for showing the press of the die cap.

To accommodate delivery of liquid alloy material from crucible or reservoir 22 into the die, a plurality of equidistantly spaced-apart feed slots advantageously penetrate the cap 64. As shown in FIGS. 3, 4 and 5, such feed slots 70, 72, 74 and 76 are provided. However, a greater or lesser amount of such slots may be advantageously utilized or desired for continuous casting of certain rod or tube sizes and/or materials. As will be seen from FIGS. 3, 4, and 5, the feed slots incline through cap 64 toward inner cavity 48.

FIG. 5 illustrates three different ways for disposal of feed slots in die cap 64. In variant A and B the slots do not intersect the center line of the cap. In variant A the slot is inclined toward the center line, while in variant B the converse is true. In variant C, the slot intersects the center line. Each variant has a significant effect on the character of the liquid alloy motion near the freezing zone. The choice of which variant to use in a given situation depends upon the properties of the liquid alloy and the casting size.

In FIG. 6, two different ways of making slots in die cap 66 are shown using wedge 78. The choice of which way is very important, because failure to make the slots properly will render the die cap too weak and it will break under pressure in the crucible.

Referring to FIG. 2, it will be noted that feed slots 70, 72, 74 and 76 are disposed about shell 44 in an offset type of relationship. This feature acts to provide desirable liquid metal alloy entry into the die cavity in a manner to be described hereinafter. With regard to the spacing of these feed slots, FIG. 4 shows a pair of diametral planes P, P' which are normal to each other and extend longitudinally of shell 44. Plane P is disposed parallel to the center lines of feed slots 70, 74 and plane P' is disposed parallel to the center lines of feed slots 72, 76. In order to achieve the best overall operation or results, the lateral distances or spacings a, b of the center lines for feed openings 70, are disposed in opposite directions from diametral plane P and the lateral distances c, d of the center lines for feed openings 72, 76 are disposed in opposite directions from diametral plane P', and are calculated to have a preferred value. The method of calculation of these distances for symmetrical slot locations is given in U.S. Pat. No. 5,279,353.

In a continuous casting operation utilizing the above described die construction in conjunction with the general type continuous casting apparatus which was described with reference to FIG. 1, the upper ends of feed slots 70, 72, 74 and 76 are disposed in communication with crucible 22. Thus, molten or liquid metal alloy material flows from the crucible or reservoir into the interior of the die through the plural feed slots as designated by the arrows in FIG. 7. The molten or liquid metal alloy material is preferably 350° F. above the liquidus point of the molten alloy mixture.

Figures 7A, 7B:
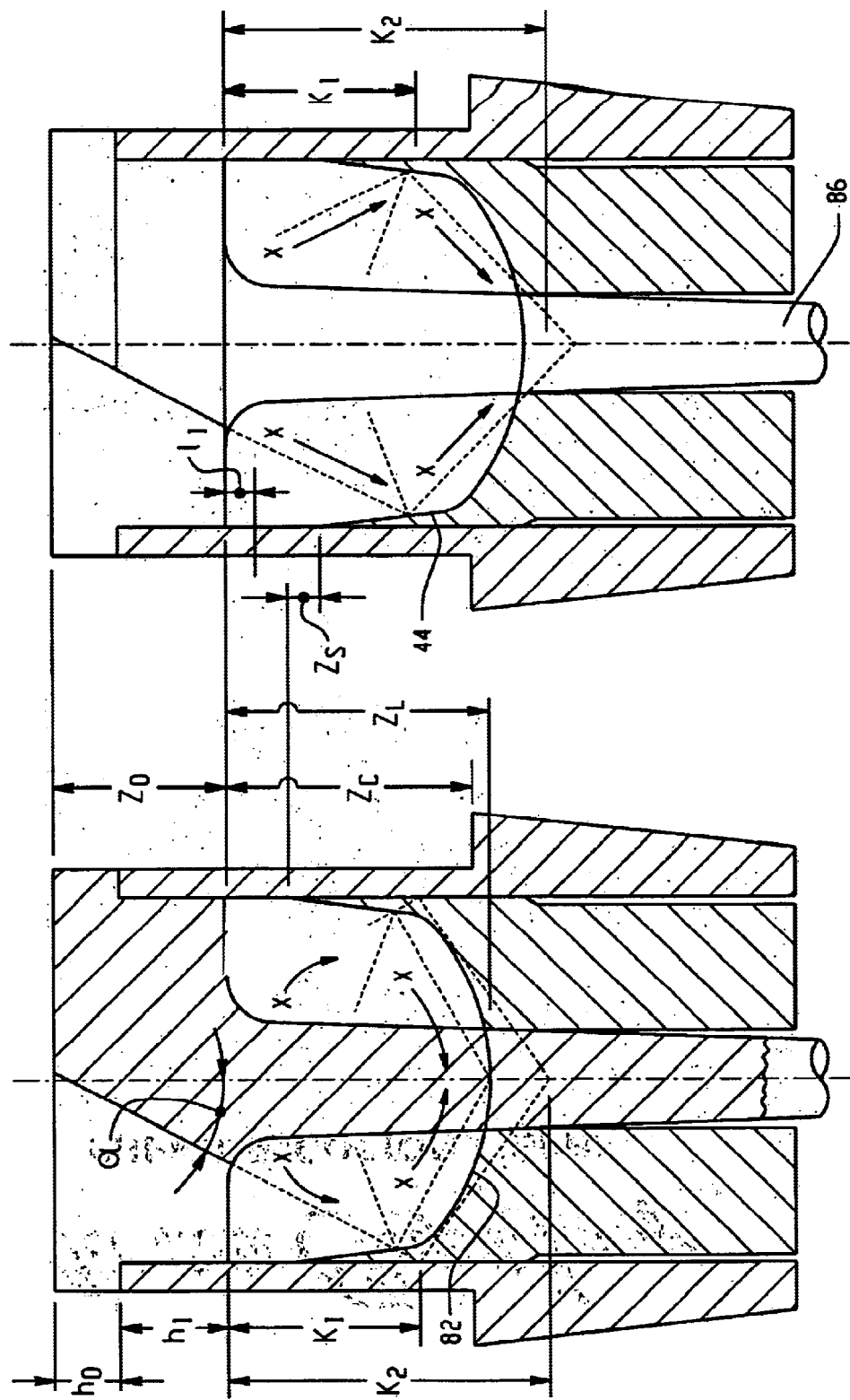
FIG. 7A shows a set of first angles and dimensions used in calculating the design of the die cap to provide the optimum conditions for formation of fine grain structures.
FIG. 7B shows a second set of angles and dimensions used in calculating the design of the die cap, to provide the optimum conditions for formation of fine grain structure.

Because of the relative relationships between these feed slots and the die cavity as shown in FIGS. 2 and 7, a very strong motion is imparted to the liquid metal alloy as it enters the die cavity. This motion is generally designated by arrows X and causes generally uniform temperatures to be generated in the liquid alloy material as it proceeds downwardly through the die to the so-called near freezing zone. This near freezing zone is spaced below the feed slots themselves and is generally designated 80 in FIG. 2. In addition, the motion sheers the primary dendrites disposed adjacent or near the die interior wall 46 and distributes them across the interface zone generally designated 82. Such distribution advantageously provides nuclei for equiaxed crystal growth at random locations in the interface zone.

Interface or transition zone 82 is immediately adjacent near freezing zone 80 and comprises that area at which the liquid alloy or semi-liquid alloy transforms into the solid state to thus define rod or tube C. The intermittent movement of pinch rolls (not shown) in pulling the strands outwardly from die exit end 50 allows this transformation to be substantially completed at an appropriate area within the die itself. Typically, each intermittent movement or stroke of the pinch rolls may move the strands somewhere in the range of approximately 0.5 inch to 1.0 inch at 30 inches per minute at various time intervals between the strokes. The rate of metal throughput (lbs/hour) will fall somewhere in the range of approximately 100–350 times the cross-section of the billet, rod, or hollow bar (in inches), whether round or non-round.

During transformation from a liquid to a solid state, the above-described motion of the liquid alloy toward and at near freezing zone 80 effects even heat distribution in the alloy material during the transition to a solid state. The even heat distribution, in turn, prevents or eliminates formation of thermal gradients of a sufficient magnitude to produce gross directional solidification of the alloy. As described hereinabove, such gross directional solidification results in the unacceptable type of macro structure shown in FIG. 2 of U.S. Pat. No. 4,315,538.

As rod or tube C is moved axially through the casting die from interface or transition zone 82, there will be some shrinkage of the rod in its transformation to the final solid state. Thus, FIG. 2 shows the outside wall 84 of the rod as being slightly spaced radially inward from die internal wall 46 as the liquid or molten copper alloy has solidified and begun to cool. Cooling of the rod or tube is facilitated by cooler 62. As previously noted, this cooler may comprise any number of types of cooling arrangements and typically provides for the passing of cooling fluid or water therethrough in a direction generally opposite to the movement of rod or tube C.

It has been found that in using the subject invention in accordance with the above-described preferred embodiment, a polygonal-type grain structure having fine grain boundaries such as is shown in FIG. 3 of U.S. Pat. No. 4,315,538 is readily obtained. Moreover, the grain size thus achieved is quite small compared to previously known and used continuous casting techniques.

After the alloy is continuously cast, it is subjected to a heat treatment. The heat treatment includes both a solution heat treatment and an age hardening treatment—that is, a spinodal decomposition heat treatment. The solution heat treatment is done at a temperature of approximately 60–80 percent of the solidus temperature for a sufficient length of time to transform the matrix of the alloy to a single phase (or very nearly to a single phase). In other words, the alloy is solution heat treated in the alpha region to homogenize. An immediate cold water quench of the alloy is then carried out. The water temperature used for the quench is at 100° F. or less. The alloy is held in the quench for at least thirty (30) minutes. Stirred quench of the preceding characteristics is preferred.

Depending upon the final mechanical properties desired, different variations of the solution heat treatment may be utilized—that is, the solution temperature may be held at the higher end of the range for a period of time beyond that required to transform the alloy to a single phase. These steps ultimately result in stronger, harder, less ductile properties upon aging for reasons which would be readily understood by one skilled in the art.

Quenching provides a means of preserving as much of the single phase (homogenized) structure obtained in the solution heat treatment. Quench media other than an aqueous medium such as water have proven to be less than satisfactory. Minimizing the time interval from removal of the billet from the heat treating furnace until the start of the quench is important. For example, any delay greater than a few minutes between removal of the alloy from the solution heat treatment furnace and quench is deleterious.

Often, fabrication of parts made from the alloy or wrought processing will be done on the alloy at this juncture because the alloy is "soft" and easier to machine or form in this state.

The next step of the heat treatment is the age hardening or spinodal decomposition heat treatment carried out at a temperature of approximately 30–60 percent of the solution heat treatment temperature for a period of time sufficient to provide the desired final properties. Depending on these desired properties, different variations of the age hardening or spinodal decomposition heat treatment may be used. In general, if a comparison is made of the properties of an alloy aged for equivalent times, but at different temperatures, more ductility and less strength or hardness is obtained at the lesser of the two temperatures. The same thermodynamic principle applies to an alloy aged at equivalent temperatures but at different times.

The final step after aging is another immediate quench, preferably with water. The need for this step may not be immediately obvious to one skilled in the art; however, we have found that optimal properties may be lost if the alloy is permitted to slowly cool after aging, even if the delay between aging and water quenching is a few minutes. Alloys are very responsive to relatively small differences in processing or composition thereby making it possible to create materials having useful different properties from the same basic alloy systems.

With respect to our heat treating procedures, we have discovered that immediate quenching with water after both the solution heat treatment and the age hardening heat treatment is critical to obtaining high strengths without sacrificing the ductile nature of the material. The terminology "immediate" quench means not more than 45–60 seconds after the material is removed from the heat treatment furnace. Preferably, the time should be as far under 30 seconds as possible.

The phase diagram for the Cu—Ni—Sn system at equilibrium is not completely known, and a description of non-equilibrium conditions is not known at all; however, we surmise that a complete diagram would show that at temperatures just below the solution heat treating temperature, the embrittling γ' phase will form rapidly and subsequently coarsen in a discontinuous fashion during aging. Likewise, if the alloy is exposed to temperatures at or somewhat below the age hardening temperature for extended times such as those associated with slow cooling or air-cooling, the embrittling γ' phase, and possibly other phases, will form rapidly. Quenching is necessary to prevent the material from slowly cooling, even for a short time, into deleterious phase fields, both stable and metastable, which we believe to exist.

Our alloy composition in conjunction with our casting and heat treating methods insure that virtually all of the material is maintained within the single phase region of an incomplete phase diagram during the solution heat treatment and inside the spinodal region during age hardening. Accordingly, we have obtained thorough spinodal decomposition and controlled precipitation of the incoherent, stable γ phase when desired, while simultaneously avoiding large discontinuous precipitates of the embrittling metastable, coherent phases at the grain boundaries and within the matrix.

The present invention will now be described in greater detail in the following examples.

EXAMPLE I

A Cu—Ni—Sn alloy containing 9 wt. % nickel, 6 wt. % tin, a remainder copper was continuous cast utilizing the foregoing continuous cast method to effect a uniform fine crystal size. At a minimum, the copper content of the foregoing continuous cast Cu9Ni6Sn was at least 84 wt. % or desired thermal conductivity was not attainable.

The amount of tin present in the Cu9Ni6Sn alloy was less than 6.3 weight percent. At a tin content greater than 6.3 wt. percent, enormous amounts of a discontinuous γ' precipitate grew from the grain boundaries. Large amounts of the precipitate were found to render a material which, although hard and strong, had no ductility whatsoever. Thus, the fractures were always brittle.

A first heat treatment "A" was done on a first sample of the Cu9Ni6Sn alloy to yield maximum ductility, thereby resulting in lower tensile strength and hardness. Pursuant to the first heat treatment "A", the alloy was subjected to a solution heat treatment at 1580° F. for five (5) hours and then immediately water quenched. This step was followed by a step wherein the alloy was aged at 570° F. for three (3) hours (spinodal decomposition heat treatment) followed immediately by a second water quenching step.

A second heat treatment "B" was done on a second sample of the same Cu9Ni6Sn alloy to yield maximum tensile strength and hardness. However, the alloy still exhibited some ductility. Pursuant to the second heat treatment "B", the alloy was subjected to a solution heat treatment at 1580° F. for five (5) hours and then immediately water quenched. This step was followed by a step wherein the alloy was aged at 815° F. for four (4) hours (spinodal decomposition heat treatment) followed immediately by a second water quenching step.

Table I shown below displays the range of mechanical properties of the Cu9Ni6Sn alloy produced according to our continuous cast process and subsequently subjected to heat treatments "A" or "B" to effect spinodal decomposition as described above. The properties vary according to the relative volume percentage of the alloy which was spinodally transformed, transformed into a transition phase which is coherent with the spinodal, and transformed into an equilibrium phase which is incoherent with the spinodal. All of these transformations are diffusion-controlled reactions and are therefore dependent on time and temperature. By metallographically examining the relative amounts of these phases present in the first sample subjected to heat treatment "A" versus those present in the second sample subjected to heat treatment "B", an estimate of an optimal heat treatment method—that is, the optimal temperature and corresponding length of time to effect an optimal solution heat treatment as well as the optimal temperature and corresponding length of time to effect an optimal spinodal decomposition heat treatment—was prepared.

TABLE I

| Cu9Ni6Sn | |
| --- | --- |
| Tensile Strength (psi) | 60,000–123,000 |
| Yield Strength (psi) | 50,000–100,000 |
| % Elongation | 40–3 |
| Rockwell C Hardness | 20–34 |

In the preferred embodiment, an optimal heat treatment was effected on a third sample of the same Cu9Ni6Sn alloy by using the optimal temperatures and time periods determined by metallographically examining the relative amounts of the phases present in the alloy subjected to heat treatment "A" as opposed to the alloy subjected to heat treatment "B." Thus, with respect to Example I, to effect an optimal heat treatment the alloy was subjected to an optimal solution heat treatment at 1580° F. for four (4) hours and then immediately water quenched followed by aging at 815° F. for three (3) hours and a second water quenching step. The resultant alloy produced had an optimal combination of ductility and strength as shown below in Table II. The alloy was not found to behave in a brittle manner during tensile testing. In fact, it reached necking strain and stretched beyond it. Furthermore, no discontinuous γ' precipitates were observed to be present in the microstructure.

TABLE II

| Cu9Ni6Sn | |
| --- | --- |
| Tensile Strength (psi) | 120,000 |
| Yield Strength (psi) | 95,000 |
| % Elongation | 3 |
| Rockwell C Hardness | 33 |

EXAMPLE II

A copper alloy containing 15 wt. % nickel, 8 wt. % tin, and a remainder copper was continuous cast utilizing the foregoing method to effect a uniform fine crystal size.

The amount of tin present in the Cu15Ni8Sn alloy was 8 weight percent at a maximum. At a tin content greater than 8 weight percent, enormous amounts of a discontinuous precipitate grew from the grain boundaries. Large amounts of the precipitate were found to render a material which, although hard and strong, had no ductility whatsoever. Thus, the fractures were always brittle.

A first heat treatment "A" was done on a first sample of the Cu15Ni8Sn alloy to yield maximum ductility, thereby resulting in lower tensile strength and hardness. Pursuant to the first heat treatment "A", the alloy was subjected to a solution heat treatment at 1580° F. for five (5) hours and then immediately water quenched. This step was followed by a step wherein the alloy was aged at 570° F. for three (3) hours (spinodal decomposition heat treatment) followed immediately by a second water quenching step.

A second heat treatment "B" was done on a second sample of the same Cu15Ni8Sn alloy to yield maximum tensile strength and hardness. However, the alloy still exhibited some ductility. Pursuant to the second heat treatment "B", the alloy was subjected to a solution heat treatment at 1580° F. for six (6) hours and then immediately water quenched. This step was followed by a step wherein the alloy was aged at 800° F. for six (6) hours (spinodal decomposition heat treatment) followed immediately by a second water quenching step.

Table III shown below displays the range of mechanical properties of the Cu15Ni8Sn alloy produced according to our continuous cast process and subsequently subjected to heat treatments "A" or "B" to effect spinodal decomposition as described above. The properties vary according to the relative volume percentage of the alloy which was spinodally transformed, transformed into a transition phase which is coherent with the spinodal, and transformed into an equilibrium phase which is incoherent with the spinodal. All of these transformations are diffusion-controlled reactions and are therefore dependent on time and temperature. By metallographically examining the relative amounts of these phases present in the first sample subjected to heat treatment "A" versus those present in the second sample subjected to heat treatment "B", an estimate of an optimal heat treatment—that is, the optimal temperature and corresponding length of time to effect an optimal solution heat treatment as well as the optimal temperature and corresponding length of time to effect an optimal spinodal decomposition heat treatment—was prepared.

TABLE III

| Cu15Ni8Sn | |
|---|---|
| Tensile Strength (psi) | 85,000–145,000 |
| Yield Strength (psi) | 55,000–137,000 |
| % Elongation | 33–2 |
| Rockwell C Hardness | 20–46 |

In the preferred embodiment, an optimal heat treatment was effected on a third sample of the Cu15Ni8Sn spinodal alloy by using the optimal temperatures and time periods determined by metallographically examining the relative amounts of the phases present in the alloy subjected to heat treatment "A" as opposed to the alloy subjected to heat treatment "B." Thus, with respect to Example II, to effect an optimal heat treatment the alloy was subjected to an optimal solution heat treatment at 1580° F. for two (2) hours and then immediately water quenched followed by aging at 815° F. for three (3) hours and a second water quenching step. The resultant alloy produced had an optimal combination of ductility and strength as shown below in Table IV. The alloy was not found to behave in a brittle manner during tensile testing. In fact, it reached necking strain and stretched beyond it. No discontinuous γ' precipitates were observed to be present in the microstructure.

TABLE IV

| Cu15Ni8Sn | |
|---|---|
| Tensile Strength (psi) | 135,000 |
| Yield Strength (psi) | 120,000 |
| % Elongation | 5 |
| Rockwell C Hardness | 36 |

The ranges of mechanical properties shown in Tables I–IV cannot be obtained from other "as cast" billets subjected to spinodal decomposition heat treatment. One must necessarily use a wrought processing step for a typical "as cast" billet to achieve the mechanical properties realized utilizing our invention. Even if wrought processing is used, the end products still retain inverse segregation which cannot be overcome for alloys having wide freezing ranges. Unless very large amounts of cold work are introduced into the material, the characteristic brittle behavior is manifest, rendering such materials more or less useless.

In addition, upon review of microphotographs of the alloys manufactured pursuant to Examples I and II, it was discovered that the grain boundaries were essentially free of the discontinuous γ' phase precipitate.

Table V, shown below, sets out a number of unwrought alloy compositions and the various parameters used to solution heat treat and age the compositions to effect unwrought, fine grain, continuous cast spinodal materials described in the present invention. The parameters shown in Table V were determined by our method of metallographic examination.

TABLE V

| SPINODAL ALLOY I.D. NO. | UNWROUGHT NOMINAL ALLOY | SOLUTION HEAT TREATMENT | | AGE HEAT TREATMENT | |
|---|---|---|---|---|---|
| | | TEMP. (° F.) | TIME (HR) | TEMP. (° F.) | TIME (HR) |
| 1 | Cu15Ni8Sn[1] | 1580 | 2–4 | 815 | 1 |
| 2 | Cu15Ni8Sn[1][3] | 1580 | 2–4 | 815 | 3 |
| 3 | Cu15Ni8Sn[1] | 1580 | 2–4 | 815 | 4 |
| 4 | Cu9Ni6Sn[1][2] | 1580 | 2–4 | 815 | 1 |
| 5 | Cu9Ni6Sn[1][2][4] | 1580 | 2–4 | 815 | 3 |
| 6 | Cu9Ni6Sn[1][2] | 1580 | 2–4 | 600 | 2 |

[1]Ni and Sn contents cited in nominal compositions are maximums in preferred alloy composition.
[2]Cu minimum is 84% by wt. in preferred alloy composition; Sn content ≤ 6.3% by wt.; Ni content < 9.0% by wt.
[3]Spinodal alloy I.D. No. 2 corresponds to the Cu15Ni8Sn alloy material shown in Table IV of Example II.
[4]Spinodal alloy I.D. No. 5 corresponds to the Cu9Ni6Sn alloy material shown in Table II of Example I.

Figure 8:
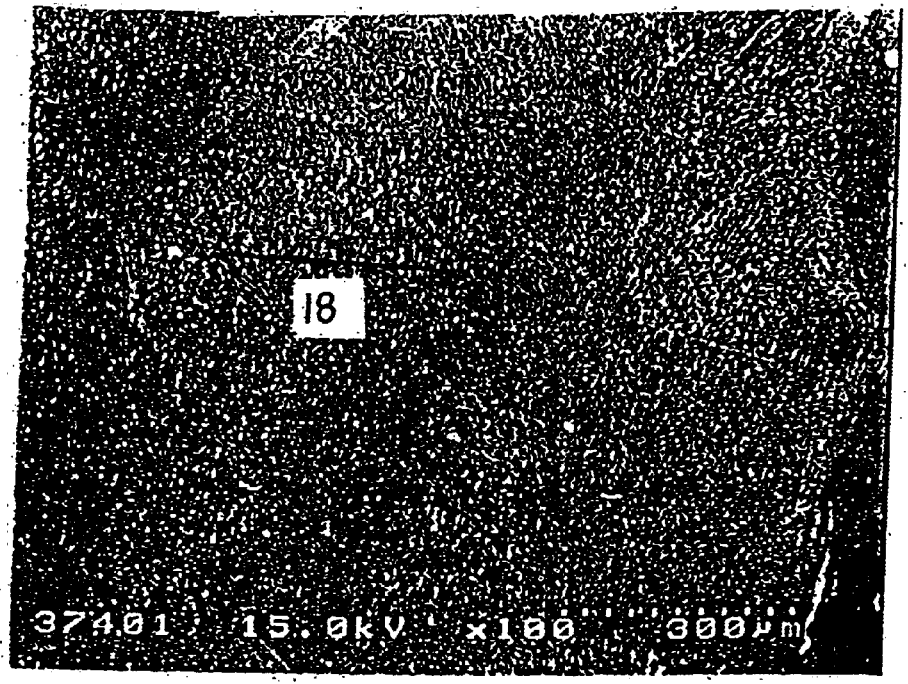
FIG. 8 is an SEM photo showing the white, stable $\gamma$ precipitates and grain boundaries of a Cu—Ni—Sn alloy.

By the terminology "metallographically examining" it is meant that photomicrographs of the material and graphic reconstruction were utilized in the following manner to determine an optimum temperature and time for a heat treatment. Using, for example, a spinodal alloy having the same composition as I.D. No. 2 in TABLE V, in which it was deemed desirable to obtain an optimized combination of hardness and ductility, an SEM photo (FIG. 8) was taken of a first sample of the alloy which was subjected to heat treatment "A" (aged at 600° F. for one hour). The SEM photo was of the polished surface of the spinodal alloy at 100 times the magnification and showed a white, stable γ precipitate. A 300 μm line was drawn on the SEM photo and it was determined that 18 of the white, stable γ precipitate particles intersected the line.

Figure 9:
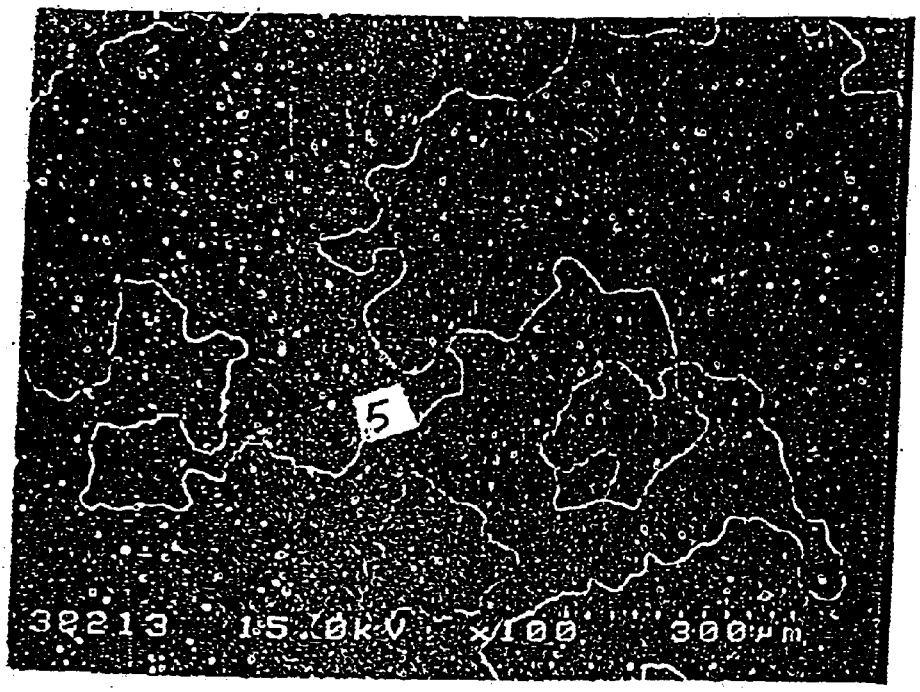
FIG. 9 is an SEM photo showing white, stable $\gamma$ precipitates and grain boundaries of a Cu—Ni—Sn alloy.

A second sample of the spinodal alloy was subsequently subjected to heat treatment "B" (aged at 800° F. for three hours). An SEM photo (FIG. 9) was taken of the polished surface of the spinodal alloy at 100 times the magnification and showed a white, stable γ precipitate. A 300 μm line was drawn on the SEM photo and it was determined that 5 of the white, stable γ precipitate particles intersected the line.

We next constructed a graph by first creating index numbers. On the index system for the aging treatment pertaining to the first sample, the product of time (1 hour) and temperature (600° F.) was 600 and the (T-t) Index was set to 100. With respect to the second sample, the product of time (3 hours) and temperature (800°) was 2400 and the (T-t) Index was set at 400.

We next determined the γ Index by making 18 white precipitate particles equal to 100, meaning that 5 white precipitate particles would correspond to a γ Index of about 30. Using the foregoing data, we made a plot of the γ Index versus the (T-t) Index as illustrated in FIG. 10.

Figure 11:
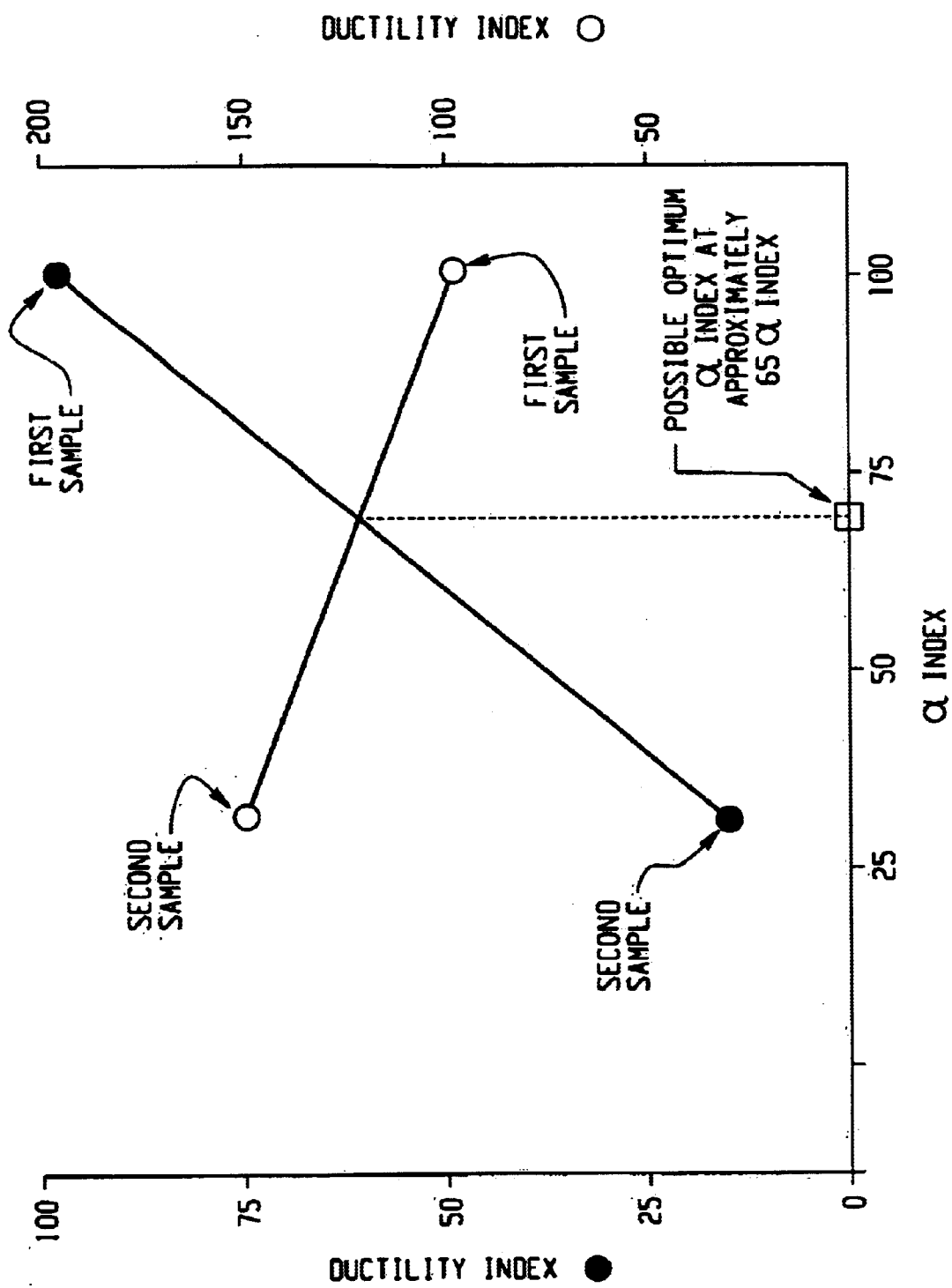
FIG. 11 is a plot of the Hardness Index and Ductility Index versus the $\gamma$ Index.

We then mechanically tested the samples and measured the hardness for each. The Hardness Index was set at 100 for sample 1 which had an $R_B$ Hardness No. equal to 74. The $R_B$ Hardness No. of sample 2 was found to equal 100. Thus, the Hardness Index was set at 150 for sample 2. As shown in FIG. 11, the foregoing data were used to construct a plot of the Hardness Index versus the γ Index.

The two samples were next tensile tested to determine ductility (% elongation). The Ductility Index was set at 100 for sample 1 having a % elongation equal to 39%. The second sample had a % elongation equal to 5. Thus, the Ductility Index was set at 13 for sample 2. As shown in FIG. 11, the foregoing data were used to construct a plot of the Ductility Index versus the γ Index.

Figure 10:
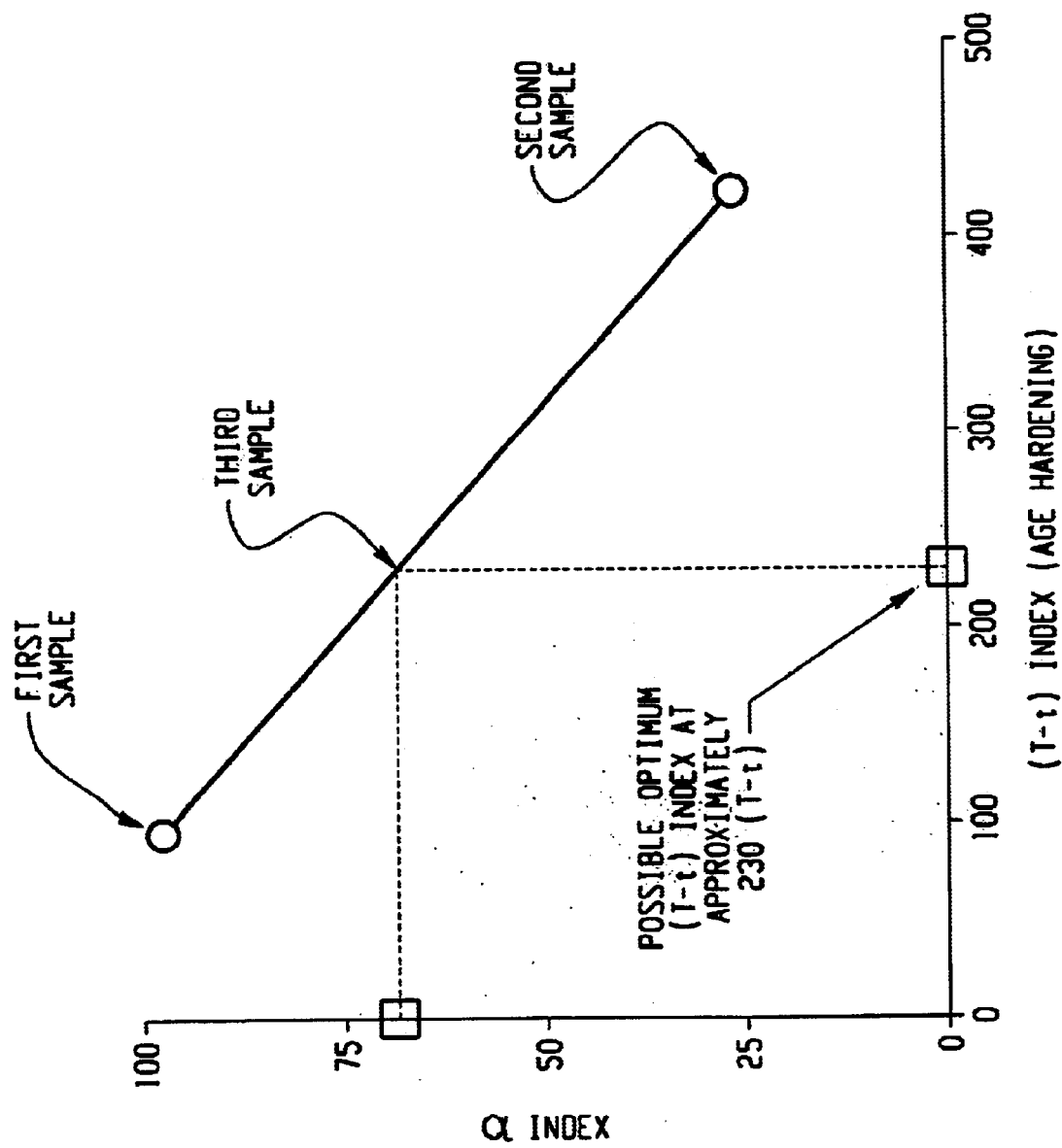
FIG. 10 is a plot of the $\gamma$ Index versus the (T-t) Index.

The locus of the intersection of the two lines plotted in FIG. 11 represented the optimum combination of hardness and ductility and corresponded to a γ Index of approximately 65 which, according to FIG. 10, represented a (T-t) Index of approximately 230 and, according to FIG. 11, represented a Hardness Index of 135 and a Ductility Index of 67. Accordingly, time and temperature for aging necessary to yield an optimized combination of hardness and ductility were found to be 1.7 hours at 815° F.

Table VI, below, sets out the index numbers determined for samples 1 and 2 of the example spinodal alloy as well as the index numbers determined for the optimum sample by means of the foregoing analysis. It should be noted that other optimized property combinations can also be obtained as required for a contemplated application by using the foregoing analysis. For example, the properties shown in Table VII were obtained using our method in order to provide materials deemed suitable, if not superior, for use in the application noted.

TABLE VI

| | T-t INDEX (° F.-HR) | γ INDEX | Y.S. INDEX | HARDNESS INDEX | DUCTILITY INDEX |
|---|---|---|---|---|---|
| SAMPLE 1 | 100 | 100 | 100 | 100 | 100 |
| OPTIMUM SAMPLE | 230 | 65 | 230 | 135 | 67 |
| SAMPLE 2 | 400 | 30 | 380 | 150 | 13 |

Since our method overcomes the necessity of the prior art methods to utilize wrought processing to effect the benefits of spinodal decomposition heat treatment for a continuous cast billet or rod, it is now possible to manufacture a wide array of cast materials with our method, materials which in the past could not be fabricated from a Cu—Ni—Sn alloy because too much cold work reduction was required to overcome their otherwise brittle nature. For example, the Cu9Ni6Sn and the Cu15Ni8Sn alloys can now be used for the manufacture of excellent bearings, gears, and other wear parts; including, aircraft landing gear bearings, press wear plates, molds for plastic injection, heavy equipment bearings and other critical parts, i.e., submarine safe materials.

Figure 12:
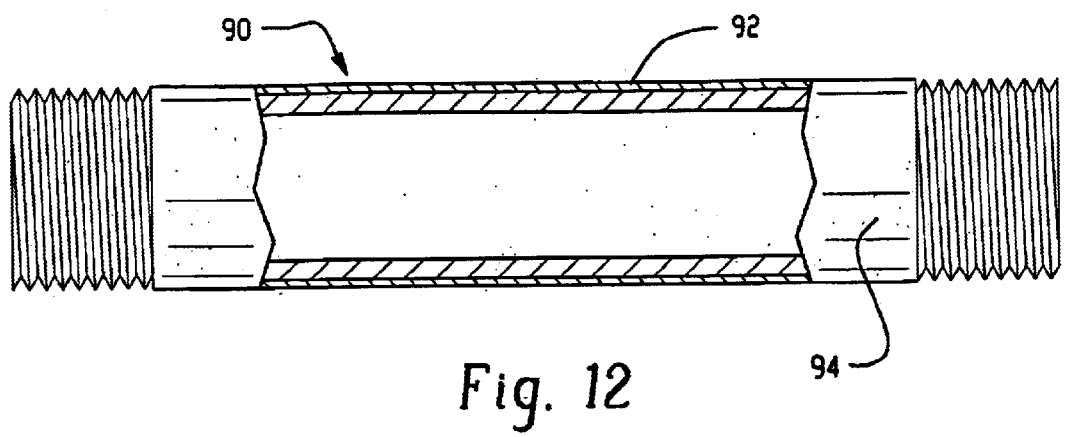
FIG. 12 shows a typical gravure printing roll.
Figure 13:
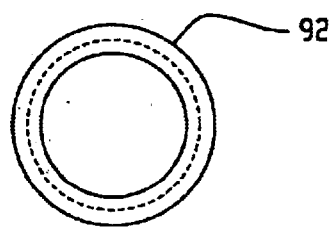
FIG. 13 shows a cross-sectional view of a typical gravure printing roll.

More particularly, our new Cu9Ni6Sn spinodal alloy can be used to manufacture a gravure printing roll 90 as illustrated in FIGS. 12 and 13. Many printed publications are made using a method known as rotogravure printing. The paper or other medium to be printed upon is placed between two rolls—one a support roll and the other a printing roll which was previously micro-engraved with a diamond stylus or laser-etched, although the support role is sometimes also engraved for printing on both sides of the paper simultaneously. The hollow printing roll 90 typically used in the past has been a steel shell with a layer of hard copper 92 electrodeposited on the outer surface. The copper layer 92 acts as the metal which is subsequently engraved and then electroplated with chromium in some cases. Both ends of the printing roll 90 are threaded to accommodate a spindle (not shown). The length of the printing roll 90 is approximately 120 inches. The printing roll 90 has an outer diameter of about 8 inches versus an inner diameter of about 6.5 inches.

We have found that a gravure printing roll 90 can be fabricated from a Cu9Ni6Sn alloy continuous cast according to our invention and subsequently heat treated as disclosed in our invention to effect spinodal transformation. The upper layer 94 of the printing roll 90 must be of a high strength and toughness, with a tensile strength of 100 psi, a yield strength of 70 psi, percent elongation of 7½ and a Vickers hardness of approximately 200. Fabricating a gravure printing roll 90 from the process disclosed in our invention eliminates the need for any electrodeposition, which is costly and environmentally troublesome. The gravure printing roll 90 fabricated from our process can be used several times by machining away the previously engraved surface and re-engraving for any new text. The rolls can be recycled for a high value. Since they have sufficient mechanical strength to provide structural functionality in the machine, it is not necessary to use a steel substrate which has a low value as a recycled material to support the rolls.

Our continuous cast Cu—Ni—Sn spinodal alloy can also be used to fabricate the plunger tip used in a general arrangement of a die casting process/machine. The plunger tip is made from our spinodal Cu—Ni—Sn alloy which is appropriately heat treated. The plunger tip forces molten metal under pressure into a mold cavity thereby maintaining the pressure. The thermoconductivity of the plunger tip is approximately twice that of steel. The plunger tip is forged or machined from a billet or rod of Cu9Ni6Sn alloy and subsequently finished and heat treated to a Rockwell C Hardness of approximately 30.

Our Cu9Ni6Sn spinodal alloy can also be used to fabricate certain components for injection molding such as a core or core pin. The core is fabricated from a rod of the Cu9Ni6Sn by drilling a passage nearly to the end of the length of the rod to allow for circulation of water introduced typically by a copper tube inserted into the drilled passage. The core is used in the injection mold assembly in such a manner so that coolant or heater fluid flows through the core design.

Figure 14:
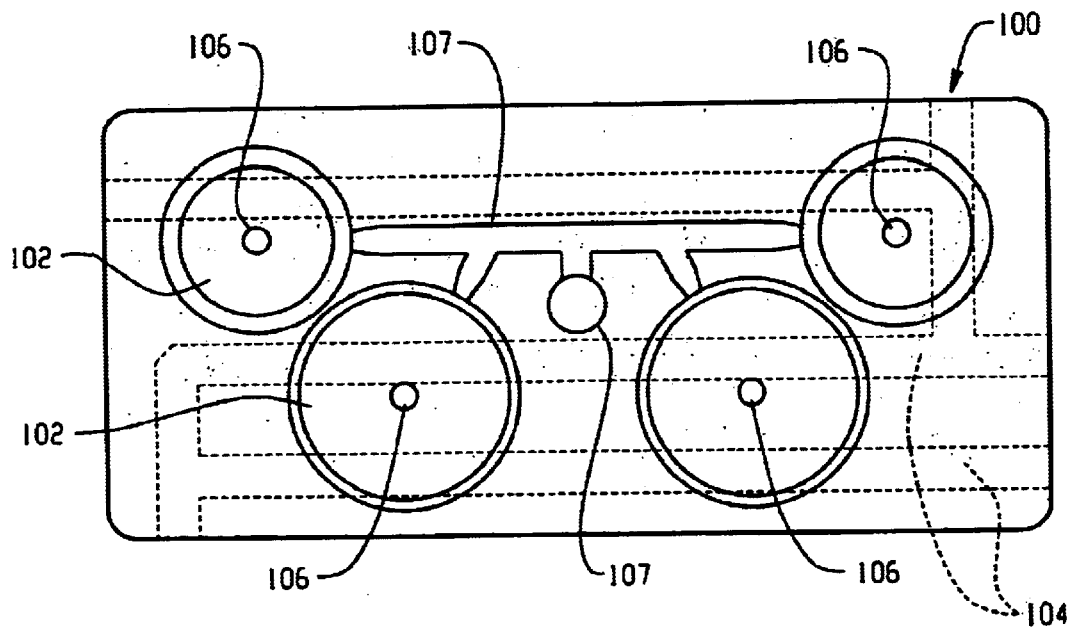
FIG. 14 shows a cross-sectional view of a water-cooled mold plate.

We have also found that our continuous cast Cu9Ni6Sn spinodal alloy can advantageously be fabricated for use as a water-cooled mold plate 100 as shown in FIG. 14. Such plates may be fluid-cooled or heated.

For example, we produced a spinodal bronze slab from a Cu9Ni6Sn alloy with dimensions 4 inches thick by 15 inches wide by 60 inches long. We heat treated it in a manner consistent with our prior examples. Its mechanical properties were consistent with those of the previous examples throughout its cross-section, including a Rockwell C Scale hardness of 33. In addition, the slab had electrical conductivity of 20% IACS at various locations throughout its cross-section. Further, its thermal conductivity was 37–40 BTU/hr-ft-ft$^2$-° F., making the material an ideal alternative to tool steels in the application of mold plates for plastic injection for a plastic injection molding process. The slab was subsequently machined into a water-cooled mold plate 100. These operations included excavating the cavities which formed the plastic products 102, creating the water-cooling passages 104, and machining the necessary apertures for, among other things, core pins (not shown), ejector pins 106, polymer injection gating 107, alignment/locating posts (not shown) and the passages (not shown) by means of which the mold plates were then attached to the tool steel base plates in the machine.

We used the mold plate 100 set in the actual production of plastic parts. The productivity of the part-making operation versus a tool steel mold set was measured to have increased through the use of the higher thermal conductivity mold plate 100 by 40% (in parts per hour of operation). This improvement was derived from the proportional decrease in the cycle period of the machine made possible because of the higher rate of heat extraction from the injected polymer and the more rapid return of the temperature of the mold plate itself to the starting temperature required to successfully begin the next injection cycle. In fact, the tool steel thermal conductivity was approximately 17 BTU/hr-ft-ft$^2$-° F. versus 40 BTU/hr-ft-ft$^2$-° F. for the mold plate set produced by means of the present invention.

The plate 100 was observed to have no noticeable wear or corrosion after 100,000 cycles. Further, the machining operations performed on the cavities included developing a fine-diamond polish on the cavity surfaces since the plastic articles required an extremely smooth and leveled surface for subsequent electroplating. The spinodal alloy of the present invention successfully developed the required finish without difficulty and was judged to develop a better polished finish than other materials which are familiarly used, e.g., steel, tool steel, copper-beryllium, copper-aluminum and aluminum alloys.

Problems previously faced by the industry in using other high conductivity tool steel substitutes included high cost, since other copper-based substitutes require numerous other processing steps to provide a metal substrate from which the mold plate can be machined. The steps are eliminated by use of our invention.

Second, some of the other copper-based tool steel substitutes were basically copper-alloyed with beryllium, among other metals. The industry wants to avoid beryllium, however, because of the environmental and health risks associated with fabricating from such metal substrates. It is also believed that mold corrosion is a problem when the material is used with certain polymers. Problems have also existed with other materials. For example, corrosion is a problem with copper-aluminum-zinc-chromium-cobalt-iron-silicon alloys due to selective leaching corrosion. Our invention, on the other hand, addresses each of these issues and concerns in the industry and amounts to an improvement in each case.

We have also found that our Cu15Ni8Sn alloy can be advantageously fabricated and used as a journal bearing, a reciprocating bearing, an aircraft landing gear and braking system bearing; a transfer stamping press guide or wear plate; or a cylinder block in hydraulic piston pumps and motors.

Figure 15:
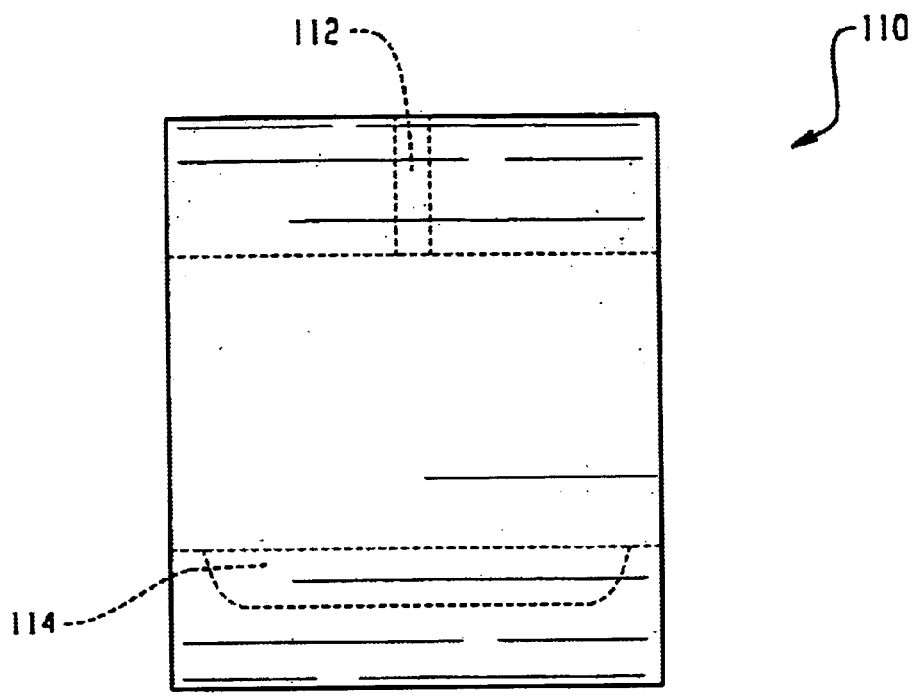
FIG. 15 shows a typical journal bearing.
Figure 16:
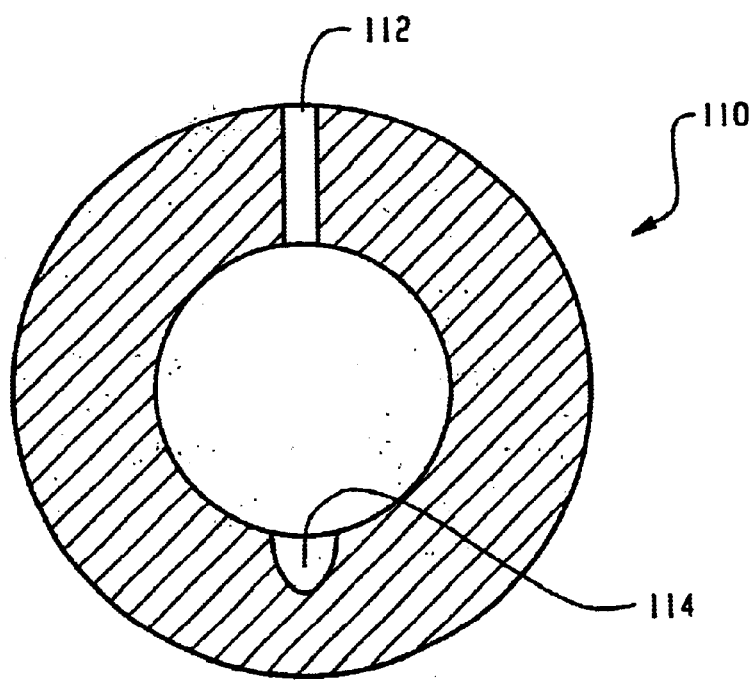
FIG. 16 shows a cross-sectional view of a typical journal bearing.

In fact, we produced a journal bearing 110 (plain bearing) as shown in FIGS. 15 and 16 from the Cu—Ni—Sn spinodal alloy disclosed in the present invention. The journal bearing 110 included a drilled hole 112 of ⅛ inch diameter for lubricant access. The journal bearing 110 also included a ⅛ inch straight groove 114 which did not extend to either end of the bearing 110. The outer diameter of the bearing 110 was about 1.5 inches in diameter as compared to an inner diameter of 1 inch.

A steel shaft was rotated under load at a constant speed continuously for two (2) days supported by the bearings and lubricated intermittently with a common commercial grease. Various combinations of load and speed were applied to the system in this manner. Loads as indicated by bearing stress varied from twenty ksi to 95 ksi. The speed of rotation of the shaft varied from 2 surface feet per minute to 30 surface feet per minute. The product of these two parameters is known as the PV value of the system. Bearings were subjected to PV values ranging from 40,000 psi-ft/min to 1,600,000 psi-ft/min. The increase in volume as described by the hollow portion of the bearings after operating generally ranged from 0 to 10.2×10$^{-9}$ in$^3$/surface feet of travel at PV up to 250,000 psi-ft/min. The same measure of wear generally ranged from 10 to less than 50×10$^{-9}$ in$^3$/ft at PV greater than 250,000 psi ft/min up to 1,200,000 psi-ft/min.

Such a performance by a plain bearing material is unparalleled in the literature.

The operating temperature of the system was measured throughout each of the bearing tests. In general, the system temperature rose less than 100° F. above room temperature (the starting temperature) when shaft rotation commenced. Under low PV, the temperature remained constant thereafter. At higher PV, the temperature increase was observed to be larger. At highest PV however, the increase was only 50° F., because the system behaved hydrodynamically and exhibited no detectable wear. The temperature under higher PV was also observed to be reduced for an extended period subsequent to intermittent lubrication at 24 hour intervals. Such temperature changes are not deleterious to system operation. We also observed that the temperature increase was lower than the alloy composition of the bearing material was such that a higher thermal conductivity was exhibited by the bearing material.

Table VII, shown below, lists some of the possible applications for those spinodal alloys identified in Table V. In addition, the minimum mechanical properties are shown for each of the alloys previously identified in Table V.

TABLE VII

| SPINODAL ALLOY I.D. NO. | MINIMUM PROPERTIES | | | | APPLICATIONS |
|---|---|---|---|---|---|
| | U.S. (ksi) | Y.S. (ksi) | e (%) | $R_B$ Hardness No. | |
| 1 | 120 | 100 | 10 | 108 | General purpose bearings; down-hole hardware |
| 2 | 135 | 120 | 5 | 110 | Gears; aircraft landing gear bearings; heavy equipment bearings |
| 3 | 135 | 125 | 3 | 115 | Metal forming dies/rolls; rock drill bit bearings; wear plates; high PV turbine bearings |
| 4 | 110 | 80 | 8 | 105 | Lower cost down-hole hardware; general purpose bearings; gravure printing cylinders |
| 5 | 120 | 95 | 3 | 106 | Continuous caster mold plates, tubes; plastic injection molds, core pins; die caster plunger tips |
| 6 | 67 | 33 | 39 | 79 | Rolling element bearing cages and retainers; pressure fittings; seals |

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

Having thus described the preferred embodiments, the invention is claimed as follows:

1. An unwrought, continuous cast, spinodal Cu—Ni—Sn alloy comprising about 8 to 16 wt. % Ni, about 5 to 8 wt. % Sn and the balance consisting essentially of Cu, the alloy being made by (a) continuously casting the above alloy in molten form from a die totally submerged in a reservoir of liquid alloy to form a non-heat treated casting, the die having feed openings arranged so that liquid alloy entering the die imparts a turbulent motion at the freezing interface between the liquid and solid alloy material forming the non-heat treating casting, whereby the non-heat treated casting exhibits an alloy matrix of fine, equiaxed crystals, (b) solution heat treating the non-heat treated casting to substantially transform its alloy matrix into a single phase immediately followed by water quenching, and (c) heating the quenched casting to effect spinodal decomposition of its alloy immediately followed by water quenching thereby forming the unwrought, spinodal alloy, wherein the grain structure of the unwrought alloy produced in step (a) is sufficiently fine and equiaxed so that substantial spinodal decomposition occurs in step (c) such that the unwrought alloy produced exhibits superior hardness and ductility as compared with an age hardened alloy made in the same way without turbulence being imparted to the alloy in the freezing interface during step (a).

2. The alloy of claim 1, wherein the alloy has a cross-sectional dimension or wall thickness of about 0.75 to 30 inches.

3. The alloy of claim 2, wherein the alloy is characterized by a substantial absence of discontinuous $\gamma'$ phase precipitate at the grain boundaries.

4. The alloy of claim 2, wherein the alloy further contains at least one additional element selected from the group consisting of B, Zr, Fe Nb, Mg and Mn, each such additional element being present in an amount of no greater than 0.3 wt. %.

5. The alloy of claim 2, wherein the alloy is in the form of a bearing, a gear, a die, a roll, a wear plate, a gravure printing cylinder or a mold plate.

6. The alloy of claim 2, wherein the alloy has a cross-sectional dimension or wall thickness of about 4 to 30 inches.

7. The alloy of claim 6, wherein the alloy is characterized by a substantial absence of discontinuous $\gamma'$ phase precipitate at the grain boundaries.

8. The alloy of claim 6, wherein the alloy further contains at least one additional element selected from the group consisting of B, Zr, Fe Nb, Mg and Mn, each such additional element being present in an of no greater than 0.3 wt. %.

9. The alloy of claim 6, wherein the alloy is in the form of a bearing, a gear, a die, a roll, a wear plate, a gravure printing cylinder or a mold plate.

10. An unwrought casting having a cross-sectional dimension or wall thickness of at about 0.75 to 30 inches and being formed from an alloy comprising about 8 to 16 wt. % nickel, about 5 to 8 wt. % tin and the balance consisting essentially of copper, the casting being formed by a continuous casting procedure in which liquid alloy is introduced into the interface zone between the liquid and solid alloy in a manner imparting turbulence to the alloy in this interface zone so that the solidified alloy produced, when age hardened, exhibits superior hardness and ductility as compared with an age hardened casting made in the same way without turbulence being imparted to the alloy in this interface.

11. The casting of claim 10, wherein the alloy further contains at least one additional element selected from the group consisting of B, Zr, Fe Nb, Mg and Mn, each such additional element being present in an amount of no greater than 0.3 wt. %.

12. The casting of claim 10, wherein the casting has a cross-sectional dimension or wall thickness of about 4 to 30 inches.

13. The casting of claim 12, wherein the alloy further contains at least one additional element selected from the group consisting of B, Zr, Fe Nb, Mg and Mn, each such additional element being present in an amount of no greater than 0.3 wt. %.

14. A process for making an unwrought, continuous cast, spinodal Cu—Ni—Sn alloy comprising about 8 to 16 wt. % Ni, about 5 to 8 wt. % Sn and the balance consisting essentially of Cu, the alloy having a cross-sectional dimension or wall thickness of about 0.75 to 30 inches, the process comprising (a) continuously casting the above alloy in molten form from a die totally submerged in a reservoir of liquid alloy to form a non-heat treated casting, the die having feed openings arranged so that liquid alloy entering the die imparts a turbulent motion at the freezing interface between the liquid and solid alloy material forming the non-heat treating casting, whereby the non-heat treated casting exhibits an alloy matrix of fine, equiaxed crystals, (b) solution heat treating the non-heat treated casting to substantially transform its alloy matrix into a single phase immediately followed by water quenching, and (c) heating the quenched casting to effect spinodal decomposition of its alloy immediately followed by water quenching thereby forming the unwrought, spinodal alloy, wherein the grain structure of the unwrought alloy produced in step (a) is sufficiently fine and equiaxed so that substantial spinodal decomposition occurs in step (c) such that the unwrought alloy produced exhibits superior hardness and ductility as compared with an age hardened alloy made in the same way without turbulence being imparted to the alloy in the freezing interface during step (a).

15. The process of claim 14, wherein the alloy further contains at least one additional element selected from the group consisting of B, Zr, Fe Nb, Mg and Mn, each such additional element being present in an amount no greater than 0.3 wt. %.

16. The process of claim 14, wherein the casting has a cross-sectional dimension or wall thickness of about 4 to 30 inches.

17. The process of claim 16, wherein the alloy further contains at least one additional element selected from the group consisting of B, Zr, Fe Nb, Mg and Mn, each such additional element being present in an amount of no greater than 0.3 wt. %.

* * * * *